United States Patent
Botting

(12) 
(10) Patent No.: US 6,273,145 B1
(45) Date of Patent: Aug. 14, 2001

(54) FOLDED AND HINGED HVAC DUCT CONNECTOR

(75) Inventor: William Andrew Botting, West Alexandria, OH (US)

(73) Assignee: Paramount Concepts Ltd., West Alexandria, OH (US)

( * ) Notice: Subject to any disclaimer, the term of this patent is extended or adjusted under 35 U.S.C. 154(b) by 0 days.

(21) Appl. No.: 09/268,925

(22) Filed: Mar. 16, 1999

(51) Int. Cl.[7] .................................................. F16L 9/00
(52) U.S. Cl. ............................ 138/166; 138/162; 138/156
(58) Field of Search ............................ 138/156, 158, 138/162, 163, 165, 166, 167, 168

(56) References Cited

U.S. PATENT DOCUMENTS

| | | | |
|---|---|---|---|
| 954,234 | 4/1910 | Wilkinson | 138/151 |
| 1,374,866 | 4/1921 | Spencer | 285/148.24 |
| 2,131,804 | * 10/1938 | Holub | 138/158 X |
| 2,359,725 | * 10/1944 | Berger et al. | 138/163 X |
| 2,917,083 | 12/1959 | Duvall et al. | 138/75 |
| 3,338,599 | 8/1967 | Hallman | 285/121 |
| 3,578,026 | * 5/1971 | Meyer, Jr. | 138/165 X |
| 3,606,404 | 9/1971 | McGann, Jr. | 285/424 |
| 3,871,145 | * 3/1975 | Hatmaker | 138/162 X |
| 4,535,197 | * 8/1985 | Butler | 138/166 X |
| 4,647,715 | * 3/1987 | Butler | 138/166 X |
| 4,734,971 | 4/1988 | Dupasquier | 138/166 X |
| 4,891,471 | * 1/1990 | Ono et al. | 138/166 X |
| 4,942,271 | 7/1990 | Corsi et al. | 138/92 X |
| 5,158,114 | * 10/1992 | Botsolas | 138/158 X |

* cited by examiner

Primary Examiner—Patrick Brinson
(74) Attorney, Agent, or Firm—Killworth, Gottman, Hagan & Schaeff, L.L.P.

(57) ABSTRACT

A plastic form having two or more sections and a hinged joint therebetween can be folded about the hinged joint and joined together by fastening devices to form a plastic duct connector for heating, ventilation and air conditioning systems.

15 Claims, 4 Drawing Sheets

FOLDED AND HINGED HVAC DUCT CONNECTOR

BACKGROUND OF THE INVENTION

The present invention relates to heating, ventilation and air conditioning (HVAC) duct systems and, more specifically, it relates to a folded and hinged plastic connector for use with HVAC duct work.

HVAC systems are designed to provide control of space temperature, humidity, air contamination, differential pressurization, and air motion. These distribution systems use a network of ducts to deliver the heated and/or cooled air to the various rooms and spaces within the building structure. These air ducts are usually rectangular or round passages and are made from a variety of materials. When these ducts are accurately sized and the duct system is correctly designed, the air will be delivered to the rooms and spaces with a minimum of resistance.

Of the many HVAC systems currently available, galvanized sheet steel duct systems are among the most widely used. These systems generally consist of an air heating and/or refrigeration unit, straight sections of duct, and multiple types of fabricated fittings and connections. From these fittings and connections, the straight sections of duct are connected to each other and to openings or vents in the rooms and spaces of the building structure. Currently, the duct and the connections and fittings are fabricated primarily by experienced sheet metal workers.

In recent times, several issues have developed with the design of the connections and fittings used in HVAC systems. First, the connections and fittings are difficult to store, handle, and transport without damaging them. In addition, due to their current shape and design, they require a large quantity of space per unit to store and transport. These problems cause excessive scrap and increased inventory holding and transportation costs for the distributor and customers.

In order to solve some of these problems, at least with duct-to-register connections, it has been proposed to fabricate sheet metal duct-to-register connectors which can be blanked and partly folded at the factory, shipped stacked compactly together, and bent into final form at the site of installation. Thus, in McGann U.S. Pat. No. 3,606,404 there is disclosed a sheet metal strip, foldable to a rectangular cross-section to fit within a register aperture, which has a margin along one of its longer edges to bend an inward shoulder, and bendable tabs extending therefrom. The shoulder seats against the outer margin of a duct opening smaller than the room surface aperture for the register. But, metal stamping of such parts requires expensive dies and equipment and the parts still must be finally formed at the site. Even then, the duct-to-register connectors of McGann are designed for use only with wood floor joists.

Another issue with the current design of the connections and fittings used in HVAC systems is the excess labor and materials cost that is often required when installing them into cement slab foundations. Without consulting all of the building codes and standards for all of the locations in which this product may be used, general installation practices demand that the duct must be painted and wrapped in plastic bags to prevent rust and corrosion when placed in a cement slab foundation. Accordingly, it would be desirable to have plastic duct work or at least plastic duct connectors.

Of course, in other fields plastic ducts are known. For example, Corsi et al in U.S. Pat. No. 4,942,271, discloses a plastic duct assembly for enclosing conduits, cables, wires, lines and the like, comprising a base having a generally U-shaped cross section along its longitudinal axis. The base includes a generally planar central portion with first and second legs extending substantially perpendicular thereto. The cover includes an intermediate portion having third and fourth legs extending substantially perpendicular thereto. The cover is pivotally and releasably coupled to the base at one end and releasably coupled to the base at the other end. The pivotal and releasable coupling is made up and released via a snap fit resulting from forces exerted substantially perpendicular to the longitudinal axes of the cover and the base. But, the Corsi et al plastic duct is not designed for use with HVAC systems. In addition, it cannot be stored and transported in the unfolded, flat position and cannot be stacked in that position to save space. It is, therefore, as awkward to handle as much of the prior art duct work.

Thus, most prior art fittings and connections are often very awkward to use and handle. The current design allows very little flexibility in assembly which in some cases increases labor and scrap cost. They also contain sharp edges and corners which occasionally cause cuts and abrasions which increase labor cost and put the laborers' safety at an unneeded risk.

Accordingly, the need still exists for inexpensive devices that provide ease of assembly and opportunities for cost reduction in labor, scrap, and inventory holding costs currently associated with HVAC duct systems.

SUMMARY OF THE INVENTION

That need is met by the present invention which provides a plastic duct connector for use in HVAC systems which effectively eases assembly, access, and reduced safety risks for installation and maintenance personnel. Further, the plastic duct connector of the present invention provides an inexpensive alternative to rigid duct fittings and connections.

The plastic duct connector of the present invention is of the type which has one end capable of being connected, by screws or otherwise, to HVAC duct work and at the other end is capable of being connected to a register opening or other HVAC duct work.

For example, it may be a register boot, a duct or duct fitting, a twist-in collar, a reducer or increaser, a cover or collar, a wyer or tee, a flex fitting, a wall stack or stack fitting or an ovals pipe or pipe fitting.

A main feature of the present invention is that a plastic form is produced, such as by injection molding, so as to have two or more sections and a hinged joint between each of the sections about which the sections may be pivoted to fold and assemble the plastic duct connector. For example, the hinged joint may be formed during the molding process such as by reducing the thickness of the plastic form at the folding point to around 0.005 to 0.12 inch so as to form a living hinge, which is also known as a pinless plastic utility hinge. Other types of hinge structures may also be used. Among the other hinge types which may be used are continuous hinge, geared hinge, lift-off multipurpose hinge, surface hinge, utility hinge, cabinet hinge, back flap hinge, plastic butt hinge, bifold-door hinge, and strap hinge structures.

The body portion of the plastic forrri is, then, preferably 0.06 to 0.2 inch thick. The plastic used to mold the plastic form is preferably polypropylene. Other plastics that will meet U/L requirements may also be used. Among the other types of plastics that may be used are acrylonitrile butadiene styrene, acrylic, polyamide, polycarbonate, polyethylene, polystyrene, polyvinyl chloride, and polyester resins.

Fastening devices are located at the edges of the body portion of the plastic form for holding the sections together after being folded and joined. Preferably the fastening devices are cantilever self-locking snaps having snap tabs/locking tabs formed during the molding process. Other types of fastening devices may also be used. Among the other types of fastening devices that may be used are positive-locking hook latch, snap slide latch, spring clip holder, plastic snap rivets, plastic removable rivets, push-in panel rivets, keyhole panel rivets, panel rivets, ratchet rivets, and tree rivets fasteners. Once the plastic form is in the desired location, the sections are then folded together completely until all the fastening devices have engaged.

Because the duct connector of the present invention is plastic, it has a number of advantages over sheet metal ones. That is, it does not have sharp edges, it is lightweight, it is easily manufactured in various sizes and shapes at low cost, it is rust proof, it is electrically non-conductive, it has a lower thermal conductivity, it is more flexible, etc. All of that makes it more easily, safely, and efficiently installed, particularly in cement slab foundations.

Because it is of a hinged, foldable construction, it has a number of other advantages. Thus, it may be stored and shipped in unfolded and stacked condition, it is easily assembled and disassembled, it is adjustable, etc. Again, all of that make it more easily, safely and efficiently installed.

Accordingly, it is an object of the present invention to provide a new and improved duct connector for use in HVAC systems and to provide a plastic form adapted for installation in such systems by folding to form a duct connector.

These and other objects, features and advantages of the present invention will become apparent from the drawings, detailed description and claims.

DETAILED DESCRIPTION OF THE INVENTION

Figure 1:
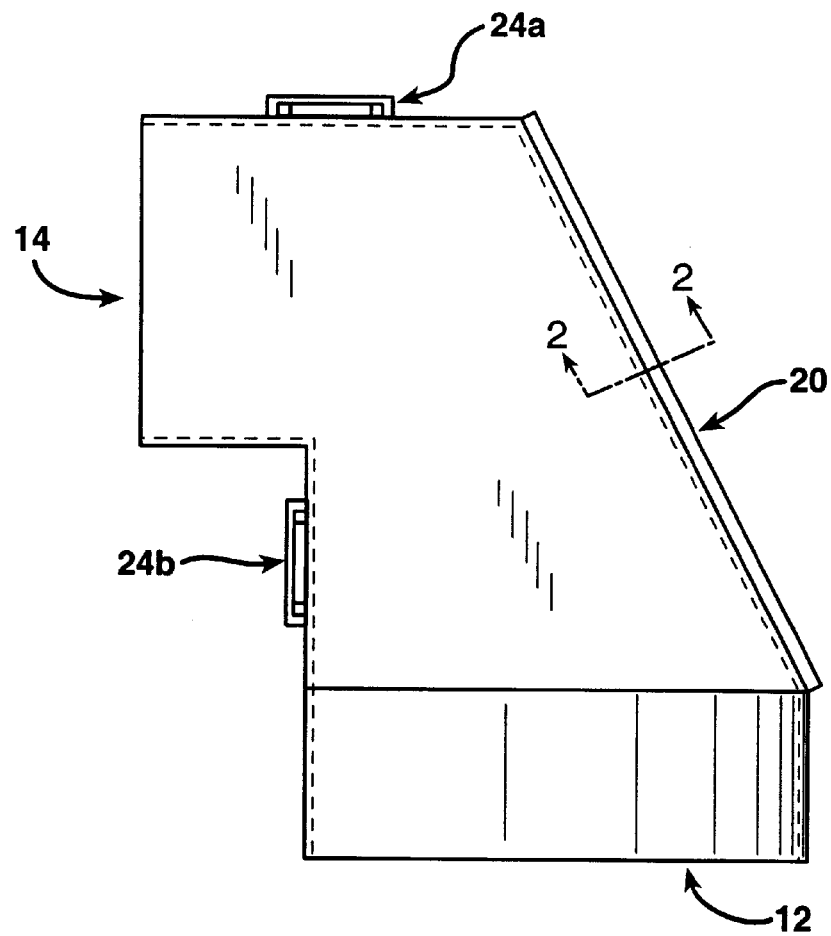
FIG. 1 is a side, plan view of one embodiment of the duct connector of the present invention.
Figure 3:
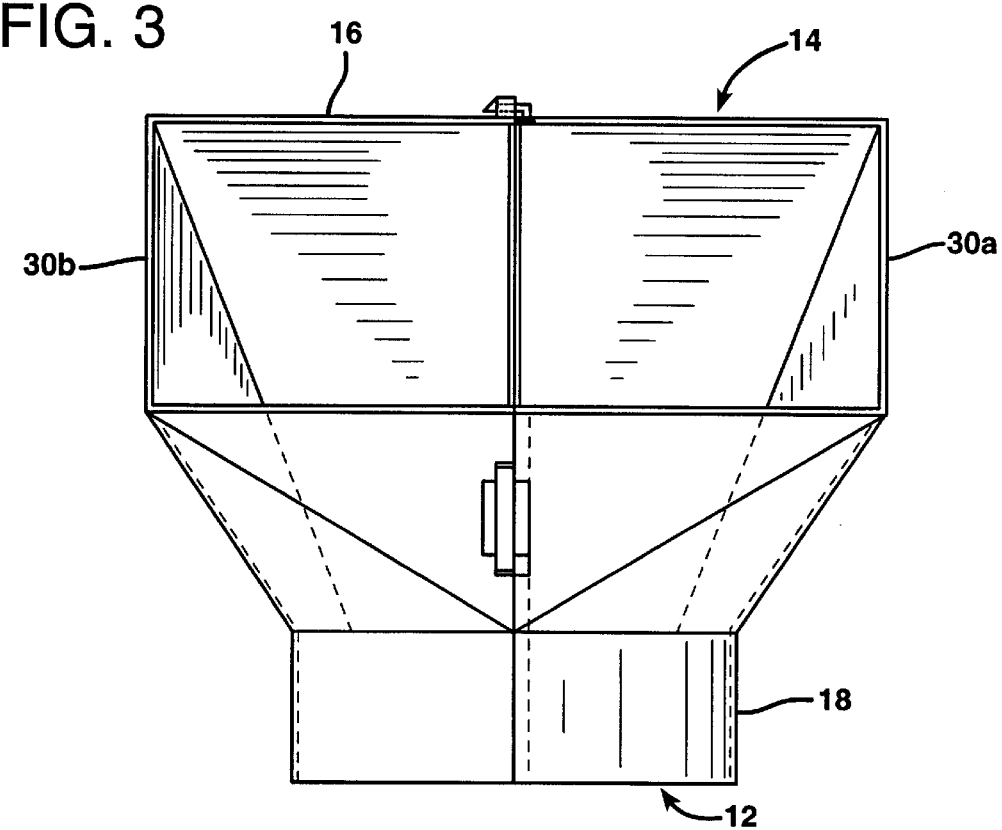
FIG. 3 is a perspective end view of the duct connector of FIG. 1.
Figure 4:
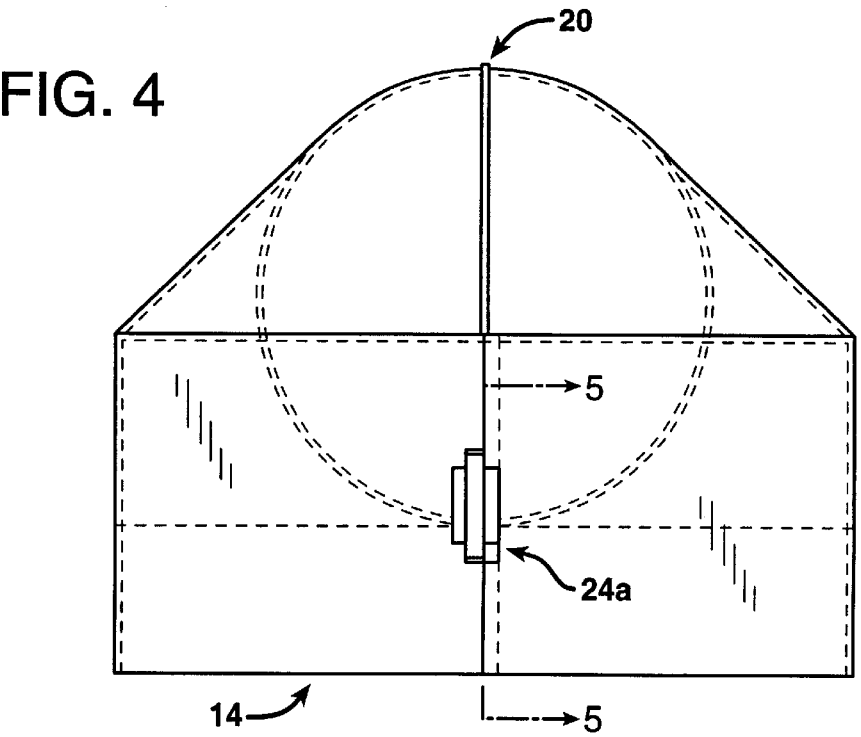
FIG. 4 is a perspective top view of the duct connector of FIG. 1.

Referring to FIGS. 1, 3 and 4, there is shown a preferred embodiment of the assembled duct connector 10 of the present invention which in this embodiment is a duct-to-register connector, ie. an L-boot duct connection. In the view of FIG. 3, for example, opening end 12 is adapted to be connected to conventional straight line duct work and is circular in cross-section, having for example a diameter of 4, 6, 7 or 8 inches.

Conventional sheet metal screws or self-taping screws or stem fasteners may then be secured through the wall having surface 18 and the abutted straight-line duct work to join the duct connector to the duct work. Opening end 14 is, then, adapted to be connected to a rectangular register opening. The rectangular opening end 14 may have a dimension of 4 by 10, or 4 by 12 inches. Screws through wall 16 may be used to connect opening end 14 to the register opening. Other types of fasteners may also be used. Alternatively, in other embodiments opening end 14 may be connected to other HVAC duct work rather than a register opening.

Figure 2:
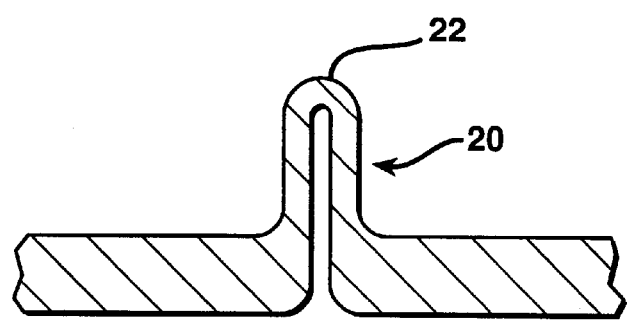
FIG. 2 is a sectional view taken along line 2—2 in FIG. 1.
Figure 5:
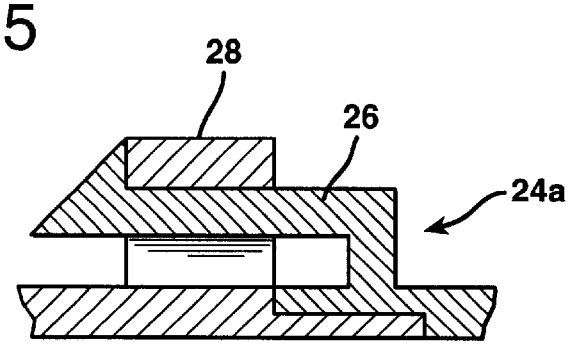
FIG. 5 is a sectional view taken along line 5—5 in FIG. 4.

As can be seen from FIG. 2, hinged joint 20 is in the form of a folding point 22 with walls of reduced thickness. The sections 30a and 30b of the duct connector as shown in FIG. 3 can be pivoted about folding point 22 to join the sections together. Fastening devices 24a and 24b are used to secure the sections together, as shown in FIG. 1. A preferred embodiment of the fastening devices is shown in FIG. 5, where snap tab 26 is shown interfitted with locking tab 28.

Figure 6:
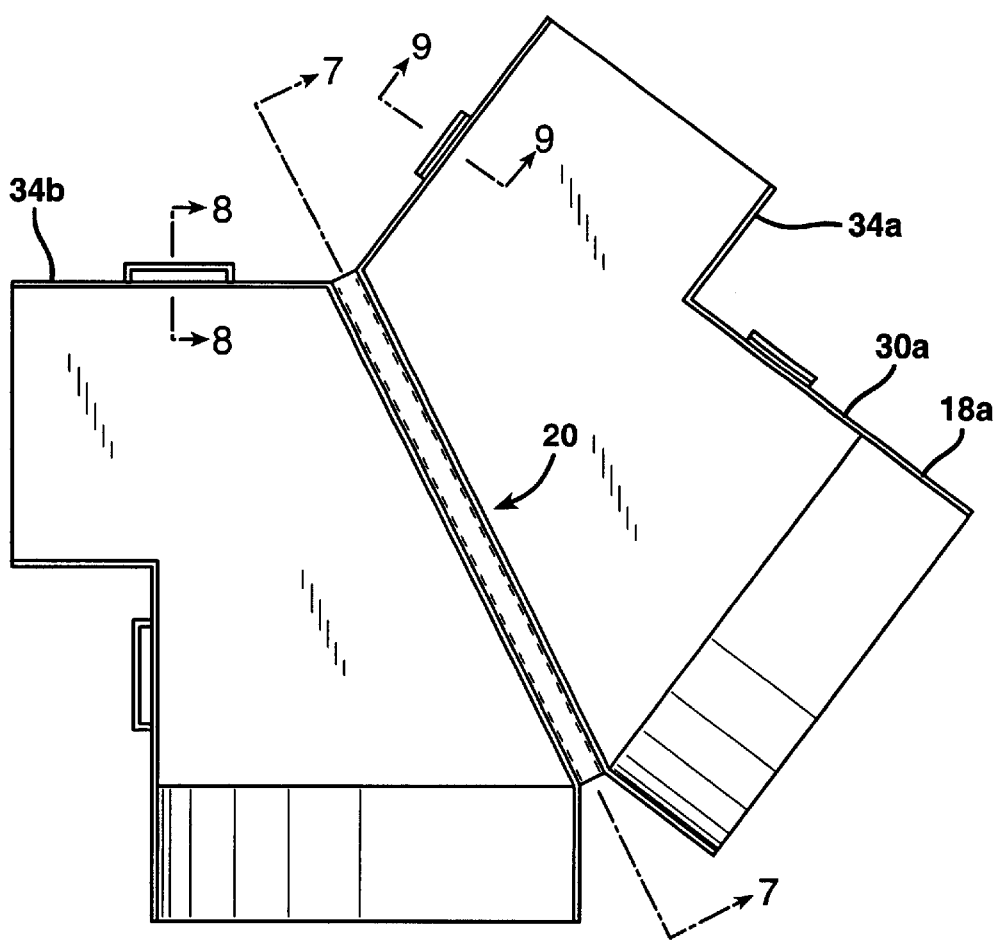
FIG. 6 is a perspective view of one embodiment of plastic form of the present invention.
Figure 7:
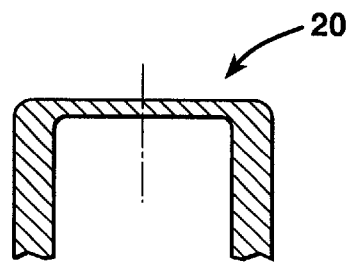
FIG. 7 is a sectional view taken along line 7—7 in FIG. 6.
Figure 8:
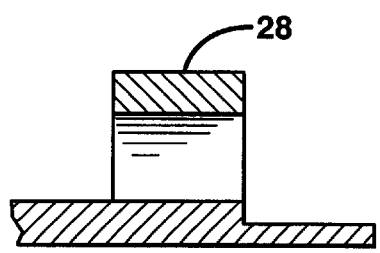
FIG. 8 is a sectional view taken along line 8—8 in FIG. 6.
Figure 9:
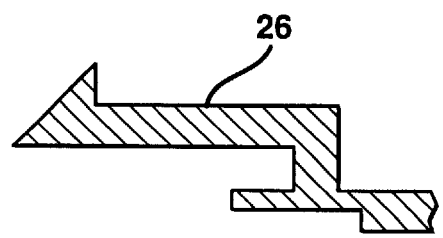
FIG. 9 is a sectional view taken along line 9—9 in FIG. 6.

Thus, duct connector 10 is a folded, hinged one formed from a plastic form 40 as shown in FIG. 6, where like numerals have been used to show the sections 30a and 30b. Also shown is the wall surrounding opening end 12 made of portions 18a and 18b of sections 30a and 30b. On the other hand, the wall surrounding opening end 14 is made of portions 34a and 34b of sections 30a and 30b. Finally, hinged joint 20 is between the sections. The unfolded hinged joint 20 and folding point 22 is shown in FIG. 7. The preferred form of the fastening devices is also illustrated in that locking tab 28 is shown in more detail in FIG. 8 and snap tab 26 is shown in more detail in FIG. 9.

In any event, plastic form 40 is a molded plastic one which may have the shape shown in the drawings. Alternative shapes, such as other cross-sectional shapes for opening ends 12 and 14, will occur to one skilled in the art as long as a duct connecting ability for the particularly HVAC system involved is maintained.

The plastic duct connector of the present invention can be stored and transported in the unfolded position as shown in FIG. 6 and may be stacked in this position to utilize space. To install the connection utilizing the entire design, the form should be taken in the unfolded position, as shown in FIG. 6, and placed in the desired position. Once the plastic duct connector is in the desired location, it is then folded together completely until all the fastener devices have engaged. The plastic duct connector is then secured into position using conventional methods such as sheet metal screws. This process is reversible and therefore the plastic duct connector may be removed if necessary by reversing the installation process (i.e., unsecure folding duct, disengage snaps, etc.).

The body portion of plastic form 40 may be about 0.06 to 0.2 inch thick injection molded plastic such as 0.08 inch thick polypropylene. Injection molding may be achieved using polypropylene at 350 to 6000 F temperature and 1000 psi to 10000 psi pressure. Other molding techniques such as vacuum forming, compression molding, and transfer molding may alternatively be used.

Figure 10:
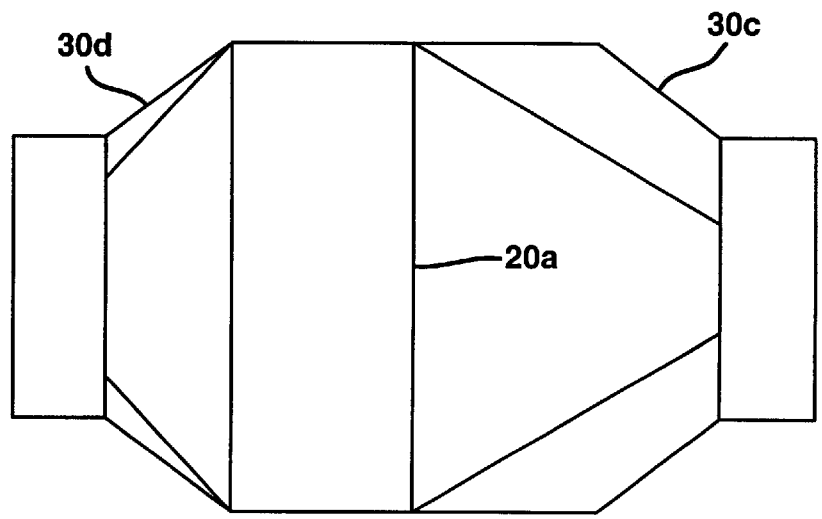
FIG. 10 is a perspective view of another embodiment of the duct connector of the present invention.

However, injection molding permits, because of the mold type used, creating a reduced thickness, between 0.005 and 0.12 inch, such as about 0.02 to 0.04 inch, at hinged joint 20. That reduced thickness creates a living hinge effect for hinged joint 20, allowing pivoting around hinge joint 20 for folding and unfolding duct connector 10. FIG. 10 shows another embodiment of the present invention, namely a plastic form for a front folding duct L-boot 50. This shows an alternative location for the hinged joint, shown as 20*a*, for the duct-to-register connection shown in FIGS. 1–9, and, therefore, alternative sections, shown as 30*c* and 30*d*.

While certain representative embodiments and details have been shown for purposes of illustrating the invention, it will be apparent to those skilled in the art that various changes in the articles disclosed therein may be made without departing from the scope of the invention, which is defined in the appended claims.

What is claimed is:

1. An HVAC plastic duct connector for heating, ventilation and air conditioning systems, said plastic duct connector having one end capable of being connected to heating, ventilation or air conditioning duct work and having another end capable of being connected to a register opening or other heating, ventilation or air conditioning duct work, said duct connector being formed from a plastic form with two or more sections each having a body portion and with a hinged joint between said sections whereby said sections may be pivoted about said hinged joint, and joined together, said sections having fastening devices at the edges of said body for portions holding said sections together after being joined.

2. The HVAC plastic duct connector of claim 1 wherein said hinged joint is a living hinge.

3. The HVAC plastic duct connector of claim 2 wherein said fastening devices are snap tabs and locking tabs.

4. The HVAC plastic duct connector of claim 3 wherein said body portions have a thickness of about 0.06 to about 0.2 inch and said hinged joint has a thickness of about 0.005 to 0.12 inch.

5. The HVAC plastic duct connector of claim 4 wherein said plastic is polypropylene.

6. The HVAC plastic duct connector of claim 1 wherein said plastic blank is formed by injection molding.

7. A plastic form adapted for installation in heating, ventilation and air conditioning systems by folding to form an HVAC plastic duct connector, comprising a plastic form with two or more sections each having a body portion and with a hinged joint between said sections whereby said sections may be pivoted about said hinged joint and joined together, said sections having fastening devices at the edges of said body portions for holding said sections together after being joined, and each said sections being formed so that, at one end thereof, after being formed into an HVAC plastic duct connector, there is a connector for heating, ventilation or air conditioning duct work and being formed so that at another end thereof, after being formed into an HVAC plastic duct connector, there is a connector for a register opening or other heating, ventilation or air conditioning duct work.

8. The plastic form of claim 7 wherein said plastic is polypropylene.

9. The plastic form of claim 8 wherein said hinged joint is a living hinge and said fastening devices are snap tabs and locking tabs.

10. The plastic form of claim 9 wherein said body portions have a thickness of about 0.06 to 0.2 inch and said hinged joint has a thickness of about 0.005 to 0.12 inch.

11. A method of installing a plastic duct connector in a heating, ventilation or air conditioning system comprising:

providing plastic form adapted for installation in heating, ventilation and air conditioning systems by folding, comprising a plastic form with two or more sections each having a body portion and with a hinged joint between said sections, and fastening devices at the edges of the body portions for holding said sections together, folding said sections together by pivoting about said hinged joint, joining said sections by use of said fastening devices to form a plastic duct connector having one end and another end, connecting said plastic duct connector at one end to heating, ventilation or air conditioning duct work, and connecting said plastic duct connector at another end thereof, to a register opening or other heating, ventilation or air conditioning duct work.

12. The method of claim 11 wherein said plastic is polypropylene.

13. The method of claim 12 wherein said hinged joint is a living hinge and said fastening devices are snap tabs and locking tabs.

14. The method of claim 13 wherein said body portions have a thickness of about 0.06 to 0.2 inch and said hinged joint has a thickness of about 0.005 to 0.12 inch.

15. The HVAC plastic duct connector of claim 1 wherein said HVAC plastic duct connector is a register boot, a duct or duct fitting, a twist-in collar, a reducer or increaser, a cover or collar, a wyer or tee, a flex fitting, a wall stack or stack fitting, or an oval pipe or pipe fitting.

* * * * *